United States Patent [19]

Kadau et al.

[11] 4,259,111
[45] Mar. 31, 1981

[54] ALLOY FOR WELDING RODS AND THE LIKE

[75] Inventors: Dennis K. Kadau, Highland; Stephen J. Barkovich, Canton, both of Mich.

[73] Assignee: Poly Cast, Inc., Highland, Mich.

[21] Appl. No.: 29,677

[22] Filed: Apr. 13, 1979

[51] Int. Cl.³ .............................................. C22C 19/05
[52] U.S. Cl. ........................................ 75/171; 148/32
[58] Field of Search ..................... 75/171, 170; 148/32, 148/32.5

[56] References Cited

U.S. PATENT DOCUMENTS 4,075,999   2/1978   Danis ........................................ 75/171

Primary Examiner—R. Dean
Attorney, Agent, or Firm—Robert G. Mentag

[57] ABSTRACT

A low temperature, hard surfacing, nickel base alloy having good wear resistance, and comprising chromium, silicon and molybdenum in a nickel base having up to about 2.5 percent by weight carbon, and welding rods made therefrom.

8 Claims, 2 Drawing Figures

ALLOY FOR WELDING RODS AND THE LIKE

BACKGROUND OF THE INVENTION

1. Field of the Invention

This invention relates to a nickel based alloy, and more particularly to a novel and improved nickel based hard surfacing alloy. One feature of this invention relates to the castability of this alloy, primarily for welding rods. Another feature of this invention relates to low temperature hard surfacing applications. A further feature of this invention relates to the weldability of the alloy.

2. Description of the Prior Art

It is well known in the alloy art to employ cobalt-base hard facing alloys, strengthened by tungsten and containing chromium-tungsten carbides, in diverse applications where wear resistance and hardness are required, either alone or in combination with corrosion resistance and elevated temperature capacity. Cast wear-resistant alloys with compositions related closely to those of the cobalt-base hard facing alloys have also been widely used. In recent years, the price of cobalt has steadily increased, and supplies of the same have been severely limited due to political conditions in foreign countries from which cobalt is imported. Tungsten is also a scarce material. In order to overcome the problems of supply and increasing cost of cobalt, efforts have been made to provide nickel based alloys for use on tools and other parts which are subject to elevated temperatures, and which require high temperature hardness and corrosion resistance. Examples of such nickel based alloys are disclosed in U.S. Pat. Nos. 2,392,821, 3,385,739 and 4,075,999.

Experimental attempts have also been made heretofore to provide nickel based alloys for low temperature hard surfacing applications. Experimental attempts have also been made heretofore to provide nickel based alloys with good weldability characteristics, and which could be used for casting welding rods. However, the aforementioned prior attempts to provide nickel based alloys for low temperature hard surfacing applications have failed because of the disadvantage of poor castability characteristics. That is, the alloys produced by such last mentioned attempts were porous, and they were too "snotty", and would not produce a good welding rod. The term "snotty" is a word used in the casting art to designate that an alloy is too thick and gooey, and it will not flow into a mold. A further disadvantage of the nickel based alloys produced in the aforementioned attempts, is that they were low in hardness and wearability.

BRIEF SUMMARY OF THE INVENTION

It is an object of this invention to provide a nickel based alloy which has good castability and weldability characteristics, and which is adapted for low temperature, hard surfacing applications. It is a further object of this invention to provide a nickel based alloy which is substantially free of cobalt and tungsten. It is still another object of the present invention to provide a nickel based alloy which overcomes the aforementioned disadvantages of the alloys produced in the aforementioned experimental attempts to produce nickel based alloys for low temperature, hard surfacing applications.

The alloy of the present invention has about 50 to 60 percent by weight nickel, about 1.8 to 2.5 percent by weight carbon, about 29.0 to 31.0 percent by weight chromium, and about 8.5 to 9.5 percent by weight molybdenum. Various impurities may be present in the alloy in amounts as set forth hereinafter.

The alloy of the present invention is economical to produce, and it is adapted for use in low temperature applications which require good wear resistance and hard surfacing, as for example, in railroad applications, forging construction applications as on shear bits, and oil drilling industrial applications as on drill bits. The alloy of the present invention is also advantageously adapted for casting welding rods, and it has optimum characteristics of castability and weldability.

DESCRIPTION OF THE PREFERRED EMBODIMENTS

Figure 2:
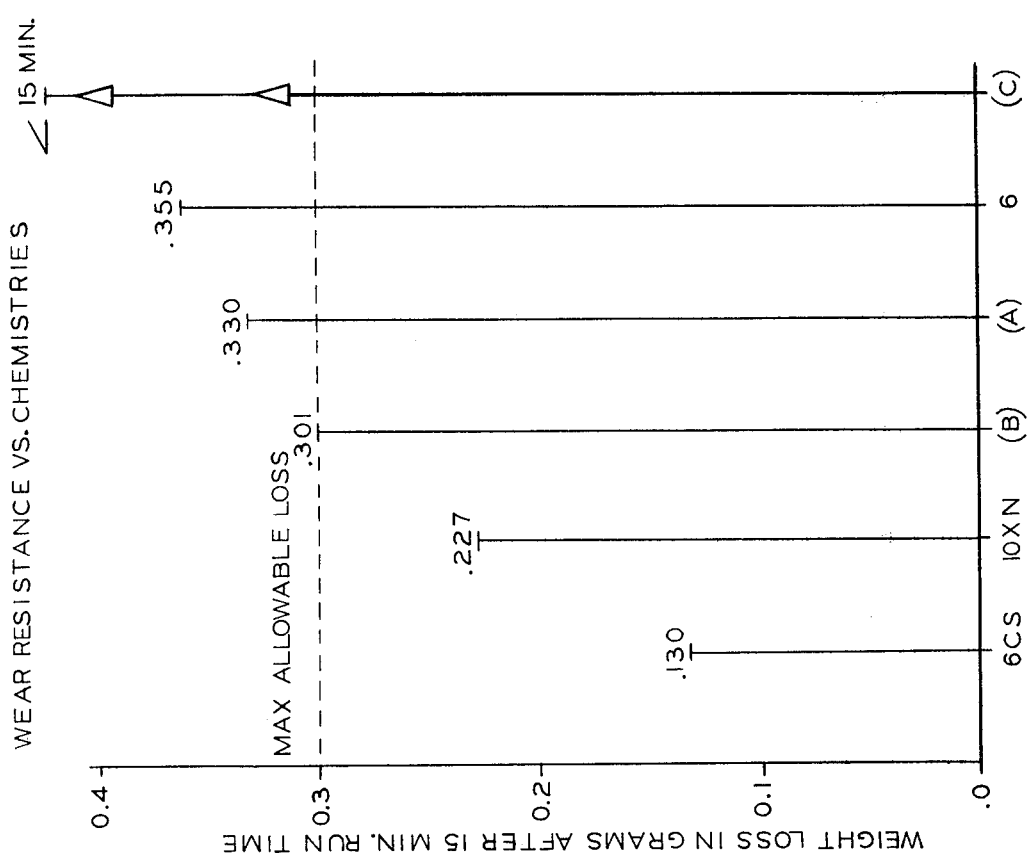
FIG. 2 represents a graph of the wear resistance in terms of weight loss per unit of time for the alloy "10XN" of the present invention versus a number of standard alloys.

The alloy of this invention is nickel based and contains approximately 50 to 60 percent, by weight, nickel. The base element, nickel, provides toughness, impact resistance, and a suitable, readily available eutectic constitutent when combined with the proper types and amounts of alloying elements as set forth hereinafter.

Chromium is added to the nickel base, and it must be 29.0 to 31.0% by weight of the total alloy. Chromium is added to impart hardness, abrasion and wear resistance to the alloy. The chromium combines with the nickel to form a eutectic matrix for the alloy system of this invention. It has been observed that chromium in excess of 31%, however, will adversely affect the carbide structure such that while the alloy will be harder, its wear resistance will be lower. Also, if the chromium level would be under 29%, both wear resistance and hardness would be inadequate to accomplish the objectives of this invention.

Carbon must be added in the amount of 1.8 to 2.5% by weight of the total alloy. The carbon is necessary to form the hard, dispersed carbide microstructure of this alloy, which contributes heavily to the hardness and wear resistance. The carbon that is not tied up as carbides is present throughout the eutectic matrix and serves to provide a lubricant (graphite) in metal-to-metal wear. When the carbon content is below 1.8%, enough carbides are not present to impart the required hardness. If carbon levels exceed 2.5%, the grain structure is affected such that the alloy becomes brittle and unsuitable for wear resistance.

Molybdenum is required to be present in the alloy in amounts of 8.5–9.5% by weight of the total alloy to achieve the proper amount and size of carbide particles. It has been observed that molybdenum under 8.5% or over 9.5% will not give proper amount of carbides which make the alloy hard and resistant to wear.

The final alloying element is silicon, and it must be present in the amount of 1.5–2.5% by weight of total alloy. The silicon serves three required functions to accomplish the objectives of this invention. The first function is that as a deoxidant during the melt down of the alloy, the casting of the alloy into rod, and the deposition of the rod. The second function is to add fluidity to the alloy so that it may readily be cast into rod and for acceptable deposition of the rod. The last function is to graphitize the carbon that is not tied up as a carbide. Silicon content under 1.5% results in an alloy that is not fluid enough in the molten condition to be deposited (welded) with current techniques. When the silicon content exceeds 2.5%, the alloy becomes too fluid and cannot be controlled to be properly deposited (welded) to form an even wear surface.

The only impurity allowed in a high concentration is iron. It may be present up to 3.5% maximum by weight of the total alloy without any detrimental effects on the properties of the alloy. Manganese and cobalt may be present up to 0.50% maximum each by weight of the total alloy. Other impurities may be present up to 0.2% maximum each by weight of total alloy maximum.

Table I is the final chemistry or analysis of the alloy of the present invention, which is identified herein as "10XN".

TABLE I

|  | Percentage by Weight |
|---|---|
| Carbon | 1.8-2.5 |
| Silicon | 1.5-2.5 |
| Chromium | 29.0-31.0 |
| Molybdenum | 8.5-9.5 |
| Iron | 3.5 maximum |
| Cobalt | .50 maximum |
| Manganese | .50 maximum |
| Phosphorus | .02 maximum |
| Sulfur | .02 maximum |
| Boron | .02 maximum |
| Tungsten | .02 maximum |
| Nickel | Balance |

Figure 1:
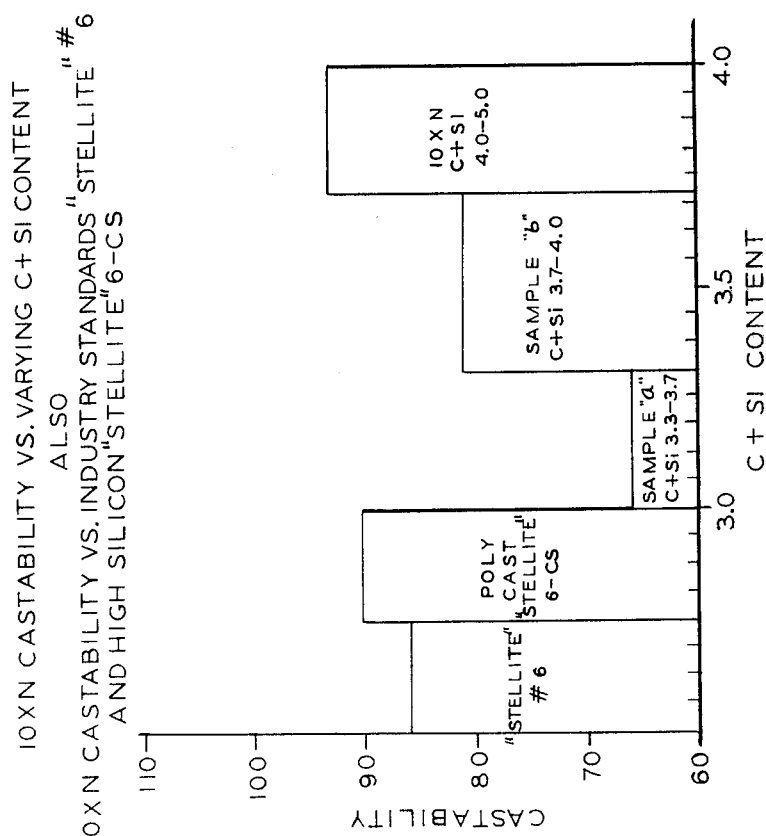
FIG. 1 of the accompanying drawing represents a graph of castability versus carbon plus silicon content for a number of standard alloys compared to the alloy of the present invention which is identified by the term "IOXN".

The following Table II is a table of chemistries of common alloys which have been compared for castability and wear resistance in FIGS. 1 and 2 of the drawing. The residuals have been omitted in order to shorten the tables. "Stellite" is a trademark of The Stellite Division of Cabot Corporation, Kokomo, Ind. "Stellite" No. 6 is a cobalt based alloy that is used as an average industry standard for acceptable wear resistance. Poly Cast "Stellite" 6CS is a cobalt based alloy made by Poly Cast Inc. of Highland, Mich. Samples "A", "B" and "C" are nickel based alloys which each have an analysis that does not fall within the analysis for an alloy of the present invention as set forth in Table I hereinbefore.

TABLE II

|  | C + Si | C | Mn | Si | Ni | Cr | Mo | W | Fe | Co |
|---|---|---|---|---|---|---|---|---|---|---|
| Stellite #6 | 2.4 | 1.2 | .4 | 1.2 | 2.2 | 29.0 | .15 | 4.9 | 1.5 | Bal. |
| Poly Cast Stellite #6 CS | 3.7 | 1.4 | .3 | 2.3 | 1.8 | 28.8 | .18 | 4.0 | .75 | Bal. |
| A | 3.3 | 2.3 | .5 | 1.0 | Bal. | 32.0 | 11.0 | 1.0 | 10.0 | 1.0 |
| B | 3.7 | 2.4 | .5 | 1.3 | Bal. | 30.0 | 1.5 | 1.0 | 3.0 | 1.0 |
| C | >3.3 | 1.9 | .5 | 1.0 | Bal. | 32.0 | 11.0 | 1.0 | 10.0 | 1.0 |
| 10XN | 4.0 | 1.9 | .5 | 2.1 | Bal. | 29.6 | 9.1 | — | 3.5 | — |

It should be noted from a study of the data in Table II and FIGS. 1 and 2, that the chemistry variances have been compared to wear resistance and castability rather than hardness. Hardness in the alloy of the present invention cannot be directly related to wear, and consequently, an abrasive friction metal-to-metal machine was designed to measure the weight loss, of a welding rod of each alloy of Table II, created by heat and friction over a specific time period. The machine consisted of a cantilevered arm holding a test welding rod against a 7" diameter tool steel wheel revolving at 1,700 revolutions per minute. The weight of the test rod specimen was verified before and after a 15 minute run, and the loss in grams was tabulated on a relative basis.

The welding rod castability chart of FIG. 1 illustrates the importance of the silicon additions for casting economical, quality materials.

The following is a detailed description of a method of making the alloy of the present invention, including the master heat melt down and pouring procedures.

RESTRICTIONS/PARAMETERS

Master heat size must not exceed 90% of furnace capacity. This is done to achieve complete deoxidation, and it also helps to avoid superheating of the molten bath prior to pouring.

An argon gas atmosphere must shield the charge materials from air during melt down and also while pouring.

MELT DOWN

The melt down may be accomplished in a coreless induction furnace, with preferably a 2000# furnace and a 350 Kw/540 Hz power source.

The furnace is charged in the following order:
1. Add ½ of total silicon
2. Add ⅓ of total nickel
3. Add all iron
4. Add all molybdenum
5. Add ⅓ of total carbon
6. Cover with ⅓ of total chromium
7. Add ⅓ of remaining nickel
8. Draw as much power as possible It is essential to continually draw full power and to prod the charge so that fresh metal is continuously being fed into the molten pool. This procedure prevents any superheating of the molten bath which is very injurious to the quality of the metal as it would pick up nitrogen and oxygen in excessive quantities.

It is imperative that the carbon is always covered with chromium. This will insure that the carbon goes into solution. The sandwiching of carbon between the chromium additions forces the carbon into the bath throughout melt down and also tends to eliminate "bridging", which would cause superheating.

As the melt down continues:
9. Add ½ of remaining carbon
10. Add ½ of remaining chromium
11. Add balance of nickel
Continue melting as fast as possible.
12. Add balance of carbon
13. Add balance of chromium

POURING

When the melt down is complete, bring to 2,580° F. Do not exceed. Tilt furnace to heat frontal area of furnace so metal is within 6" of pouring spout. Maintain 2,580° F. at this point and draw enough power to hold temperature. While in tilted position, a Fe-Si-Mg deoxidant is added. This material should contain 40-50% Si, 7-10% Mg, 40-45% iron and total weight of deoxidant added should equal ½% of weight of total furnace charge. The deoxidant is added by small handfuls toward the back of the furnace. The molten bath, still being under power, will carry the deoxidant down under the surface and disperse it throughout the melt. The violent deoxidaiton process (mg) will actually increase the bath by 10°–30° F. After deoxidation. raise pouring temperature to 2,620° F. (do not exceed) and pour immediately using remaining ½ of silicon for ladle deoxidation.

The following is a detailed description of a method of casting the alloy of the present invention into welding rod.

The alloy of the present invention may be cast into welding rod by conventional aspiration glass casting processes, or by $CO_2$ sandmold process. The description and details of the sand cast process are as follows:

The mold is made of a mixture composed of 30 parts 80 grit washed silica sand, 2 parts fly ash and 1 part standard commercial $CO_2$ sand binder. This mixture is mulled until homogenous in a typical foundry sand muller. The mulled mixture is put into the sand hopper of a Redford International Welding rod molding machine. The mold machine is to be operated under the normal automatic cycle mode. The only critical aspect of making a proper mold is the pressure and time duration the $CO_2$ gas is applied to the mold before it is removed from the machine. The proper pressure is 20–22 PSI and duration is 13–15 seconds. After the mold is removed from the machine it must be cured at 120°–140° F. for 24 hours minimum and must be used before 72 hours elapse from the time curing commenced.

The furnace used is a 12 pound capacity, coreless induction, roll-over casting unit. The furnace is powered by a conventional 4.2KHz, 30Kw. motor-generator set as manufactured by Inductotherm Corporation. The furnace is mounted to the standard roll-over stanchions.

Initial set-up requires a gasket, which is the same inside diameter and outside diameter of the shoulder of the mold, be made from ⅛" thick standard asbestos rollboard. Also needed is a copper chill plate ⅜" thick by 7" square.

After the furnace, which is under an argon atmosphere, has melted the master alloy of the invention, the molten metal is to be brought up to 2,620° F. casting temperature. The asbestos gasket is placed over the furnace opening. Any slag or floating debris must be removed at this point. The mold is placed on the gasket. The chill plate is set on the other end of mold and secured with the clamping mechanism of the rollover stanchion. The pressure of the clamping device on the chill plate, mold, gasket and furnace top provides a leak proof seal. The entire furnace with mold attached is quickly turned over to fill the cavities in the mold. The furnace should be held in the inverted position for 3–8 seconds, depending on rod diameter being cast, and then returned to its normal upright position. The mold is now removed from the furnace and allowed to cool for 3–5 minutes. The mold is then shaken free of the cast rods. Shrink holes on each end of the rod must now be cut off on an abrasive saw. The individual rods are then passed into a conventional centerless grinder, such as a Cincinnati Number-2 through-feed centerless grinder, to remove the rough and sand impregnated outer surface. The removal is generally 0.015" on the circumference of the rod.

What is claimed is:

1. A low temperature, hard surfacing nickel based alloy, substantially free of cobalt, and tungsten, consisting essentially of about 1.8 to 2.5 percent by weight carbon, about 1.5 to 2.5 percent by weight silicon, about 29.0 to 31.0 percent by weight chromium, about 8.5 to 9.5 percent by weight molybdenum, and about 50 to 60 percent by weight nickel.

2. The alloy of claim 1, including, 0.5 percent by weight of manganese of the total alloy.

3. The alloy of claim 2, including, 3.5 percent by weight of iron.

4. The alloy of claim 1 wherein the carbon comprises about 1.9 percent by weight of the alloy, the silicon comprises about 2.1 percent by weight of the alloy, the chromium comprises about 29.6 percent by weight of the alloy, the molybdenum comprises about 9.1 percent by weight of the alloy, and the alloy includes about 0.5 percent by weight of manganese, about 3.5 percent by weight of iron, and nickel comprises the balance of the alloy.

5. An article of manufacture comprising a low temperature, hard surfacing nickel based alloy welding rod, substantially free of cobalt and tungsten, consisting essentially of about 1.8 to 2.5 percent by weight carbon, about 1.5 to 2.5 percent by weight silicon, about 29.0 to 31.0 percent by weight chromium, about 8.5 to 9.5 percent by weight molybdenum, and about 50 to 60 percent by weight nickel.

6. The welding rod of claim 5, wherein the nickel based alloy includes, 0.5 percent by weight of manganese of the total alloy.

7. The welding rod of claim 6, wherein the nickel based alloy includes, 3.5 percent by weight of iron.

8. The welding rod of claim 5, wherein the carbon comprises about 1.9 percent by weight of the alloy, the silicon comprises about 2.1 percent by weight of the alloy, the chromium comprises about 29.6 percent by weight of the alloy, the molybdenum comprises about 9.1 percent by weight of the alloy, and the alloy includes about 0.5 percent by weight of manganese, about 3.5 percent by weight of iron, and nickel comprises the balance of the alloy.

* * * * *